(12) United States Patent
Kamiya

(10) Patent No.: US 9,944,286 B2
(45) Date of Patent: Apr. 17, 2018

(54) LOCK-UP-CLUTCH CONTROL DEVICE FOR VEHICLE

(71) Applicant: Nissan Motor Co., Ltd., Yokohama-shi, Kanagawa (JP)

(72) Inventor: Kohei Kamiya, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 15/316,244

(22) PCT Filed: Jul. 9, 2014

(86) PCT No.: PCT/JP2014/068330
§ 371 (c)(1),
(2) Date: Dec. 5, 2016

(87) PCT Pub. No.: WO2016/006064
PCT Pub. Date: Jan. 14, 2016

(65) Prior Publication Data
US 2017/0151952 A1 Jun. 1, 2017

(51) Int. Cl.
*B60W 30/18* (2012.01)
*B60W 10/02* (2006.01)
(Continued)

(52) U.S. Cl.
CPC .... *B60W 30/18072* (2013.01); *B60W 10/026* (2013.01); *B60W 10/06* (2013.01);
(Continued)

(58) Field of Classification Search
CPC ........... B60W 30/18072; B60W 30/20; B60W 10/026; B60W 10/06; B60W 10/107;
(Continued)

(56) References Cited

U.S. PATENT DOCUMENTS

| 2004/0018913 A1* | 1/2004 | Okamoto | F16H 61/143 477/62 |
| 2010/0131160 A1* | 5/2010 | Ayabe | F02D 31/007 701/54 |

(Continued)

FOREIGN PATENT DOCUMENTS

| CN | 102297260 A | 12/2011 |
| DE | 30 10 509 A1 | 9/1981 |

(Continued)

*Primary Examiner* — Huan Le
*Assistant Examiner* — Lori Wu
(74) *Attorney, Agent, or Firm* — Global IP Counselors, LLP

(57) ABSTRACT

A vehicle lock-up clutch control device includes a torque converter, a fuel cutoff control unit and a lock-up release/transmission cooperative control unit. The torque converter is disposed between an engine and a continuously variable transmission. The fuel cutoff control unit is configured to prevent fuel injection to the engine while in a coasting state with the driver's foot away from the accelerator, and configured to restart the fuel injection based on a fuel recovery permission. The lock-up release/transmission cooperative control unit is configured to carry out a cooperative control of a lock-up release control for reducing the clutch engagement capacity of the lock-up clutch and a transmission control for shifting the transmission. Then, if there is an accelerator depression operation while coasting with the lock-up clutch in an engaged state, the lock-up release timing and the shift timing are offset from one another.

10 Claims, 6 Drawing Sheets

(51) Int. Cl.
*B60W 10/06* (2006.01)
*B60W 10/107* (2012.01)

(52) U.S. Cl.
CPC ... *B60W 10/107* (2013.01); *B60W 2510/0233* (2013.01); *B60W 2510/0241* (2013.01); *B60W 2510/0638* (2013.01); *B60W 2510/1095* (2013.01); *B60W 2540/10* (2013.01); *B60W 2710/024* (2013.01); *B60W 2710/0627* (2013.01); *B60W 2710/1005* (2013.01)

(58) Field of Classification Search
CPC . B60W 2510/0233; B60W 2510/0241; B60W 2510/1095; B60W 2510/0657; B60W 2710/024; B60W 2710/0627; B60W 2710/1005; B60W 30/18
See application file for complete search history.

(56) References Cited

U.S. PATENT DOCUMENTS

| | | | | |
|---|---|---|---|---|
| 2011/0136622 A1* | 6/2011 | Enoki | ................ | B60W 10/02 477/83 |
| 2012/0071297 A1* | 3/2012 | Enomoto | .......... | F16H 61/66259 477/86 |

FOREIGN PATENT DOCUMENTS

| | | |
|---|---|---|
| EP | 1 091 148 A1 | 4/2001 |
| JP | 8-233098 A | 9/1996 |
| JP | 9-105459 A | 4/1997 |
| JP | 2001-99306 A | 4/2001 |
| JP | 2004-108545 A | 4/2004 |
| JP | 2005-331042 A | 12/2005 |
| JP | 2013-60125 A | 4/2013 |

* cited by examiner

LOCK-UP-CLUTCH CONTROL DEVICE FOR VEHICLE

CROSS-REFERENCE TO RELATED APPLICATIONS

This application is a U.S. National stage application of International Application No. PCT/JP2014/068330, filed on Jul. 9, 2014.

BACKGROUND

Field of the Invention

The present invention relates to a lock-up clutch control device for a vehicle that carries out a cooperative control of a lock-up release control and a transmission control during an accelerator depression operation from a state of coasting.

Background Information

Conventionally, a slip control device executes slip control of a lock-up clutch in order to prevent vibration when depressing the accelerator pedal from a lock-up engaged state in an automatic transmission vehicle equipped with a torque converter (refer to, for example, the Japanese Laid-Open Patent Application No. Hei 8 (1998)-233098).

SUMMARY

However, in a conventional device, if an accelerator depression operation is carried out when decelerating in a coasting state from a lock-up engaged state, there are cases in which a lock-up release control that prevents vibration and a transmission control accompanying an increase in the accelerator position opening amount are carried out simultaneously. In this case, since the timing of a change in the transmission torque during a transition to a lock-up release matches the timing of a change in the inertia torque due to shifting, there is a problem in that a great change in the vehicle G is generated due to the added torque change, etc., causing the driver to feel a shock.

In view of the problems described above, an object of the present invention is to provide a lock-up clutch control device of a vehicle that is capable of reducing the generation of a shock during an accelerator depression operation from a state of coasting.

In order to achieve the abject above, the present invention is provided with a fuel cutoff control unit and a lock-up release/transmission cooperative control unit, in a vehicle provided with a torque converter including a lock-up clutch between the engine and the transmission. The fuel cutoff control unit stops the fuel injection to the engine when in a coasting state by releasing the driver's foot from the accelerator, and restarts the fuel injection based on a fuel recovery permission. The lock-up release/transmission cooperative control unit carries out a cooperative control of a lock-up release control that reduces the clutch engagement capacity of the lock-up clutch, and a transmission control that shifts the transmission. Then, if there is an accelerator depression operation while coasting with the lock-up clutch in an engaged state, the lock-up release timing and the shift timing are offset from one another. Here, the lock-up release control for reducing the clutch engagement capacity comprises a control to transition from lock-up engagement to slip engagement, and a control to transition from lock-up engagement to lock-up release.

Therefore, if there is an accelerator depression operation while coasting with the lock-up clutch in an engaged state (during a fuel cut of the engine), the lock-up release timing and the shift timing are shifted. That is, by offsetting the timing of the change in the transmission torque during a transition from lock-up engagement to lock-up release, and the timing of the change in the inertia torque due to shifting, the impact on the vehicle behavior is reduced, and the driver does not feel a shock. As a result, it is possible to reduce the generation of shock during an accelerator depression operation from a state of coasting.

DETAILED DESCRIPTION OF THE EMBODIMENTS

Figure 1:
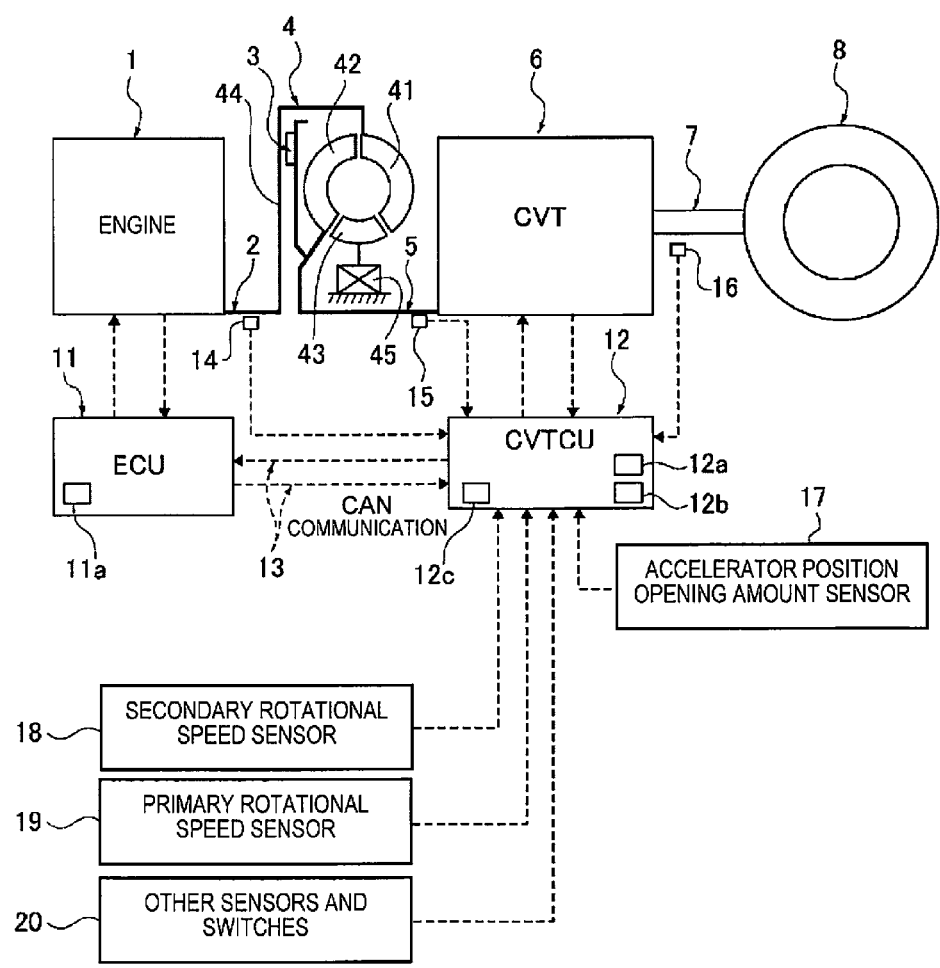
FIG. 1 is an overall system view illustrating an engine-equipped vehicle to which is applied a lock-up clutch control device of a first embodiment.

A preferred embodiment for realizing the lock-up clutch control device of the present invention is described below based on the first embodiment illustrated in the drawings.

First Embodiment

The configuration is described first. The "Overall system configuration" and the "Lock-up release/transmission cooperative control configuration" will be separately described regarding the configuration of the lock-up clutch control device in the first embodiment.

Overall System Configuration

FIG. 1 illustrates an engine-equipped vehicle to which is applied the lock-up clutch control device of the first embodiment. The overall system configuration will be described below, based on FIG. 1.

The engine-equipped vehicle drive system to which the lock-up clutch control device of the first embodiment is applied comprises an engine 1, an engine output shaft 2, a lock-up clutch 3, a torque converter 4, a transmission input shaft 5, a continuously variable transmission 6 (transmission), a drive shaft 7, and drive wheels 8, as illustrated in FIG. 1.

The lock-up clutch 3, built into the torque converter 4, couples the engine 1 and the transmission 6 via the torque converter 4 by releasing the clutch, and directly connects the engine output shaft 2 and the transmission input shaft 5 by engaging the clutch. The engagement/slip engagement/release of the lock-up clutch 3 is controlled by the LU actual hydraulic pressure that is produced based on an LU command hydraulic pressure from the CVT control unit 12, to be described later.

The torque converter 4 comprises a pump impeller 41, a turbine runner 42 that is disposed opposite to the pump impeller 41, and a stator 43 that is disposed between the pump impeller 41 and the turbine runner 42. The torque converter 4 is a fluid coupling that transmits torque by the hydraulic oil filled therein being circulated to each blade of the pump impeller 41, the turbine runner 42, and the stator 43. The pump impeller 41 is coupled to the engine output shaft 2 via a converter cover 44, the inner surface of which is the engagement surface of the lock-up clutch 3. The turbine runner 42 is coupled to the transmission input shaft 5. The stator 43 is coupled to a stationary member (transmission case, etc.) via a one-way clutch 45.

The continuously variable transmission 6 is a belt-type continuously variable transmission that continuously controls the transmission ratio by changing the belt contact diameter between a primary pulley and a secondary pulley, and the output rotation after shifting is transmitted to the drive wheels 8 via a drive shaft 7.

The control system to which is applied the lock-up clutch control device of the first embodiment comprises an engine control unit 11, a CVT control unit 12, and a CAN communication line 13, as illustrated in FIG. 1. An engine rotation sensor 14, a turbine rotation sensor 15 (i.e., transmission input rotation sensor), a transmission output rotation sensor 16 (i.e., vehicle speed sensor), an accelerator position opening amount sensor 17, a secondary rotational speed sensor 18, a primary rotational speed sensor 19, and other sensors and switches 20 are provided as sensors for obtaining input information.

The engine control unit 11 stops the fuel injection to the engine 1 when in a coasting state by releasing the driver's foot from the accelerator, and carries out a fuel cutoff control for restarting the fuel injection based on a fuel recovery permission. The fuel cutoff control is executed by a fuel cutoff control unit 11a provided in the engine control unit 11. The fuel cutoff control unit 11a receives an accelerator position opening amount signal (a zero opening amount signal indicates a foot off the accelerator.) and a fuel recovery permission from the CVT control unit 12.

The CVT control unit 12 carries out a transmission control for controlling the transmission ratio of the continuously variable transmission 6, a lock-up clutch control for switching between engagement/slip engagement/release of the lock-up clutch 3, an LU release control during accelerator depression from a coasting state, and the like.

Figure 2:
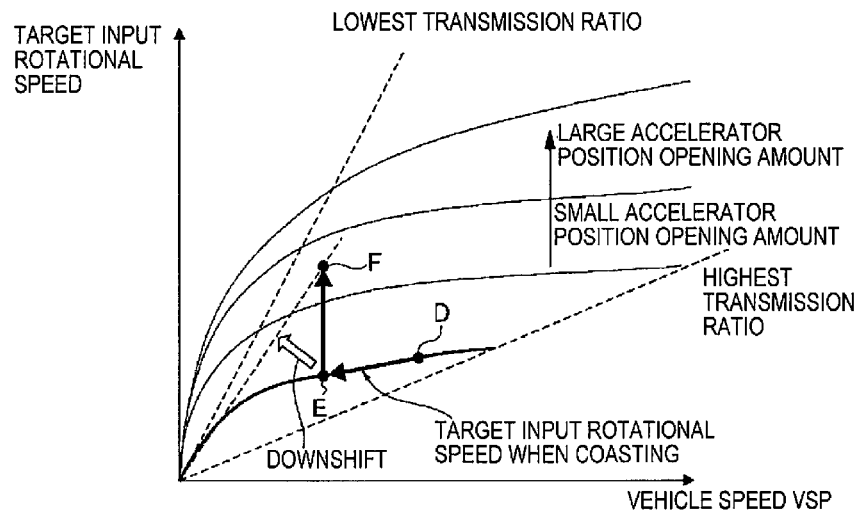
FIG. 2 is a shifting map view illustrating one example of a shifting map that is used in the transmission control of the CVT control unit.

The transmission control is executed by a transmission control unit 12a provided in the CVT control unit 12. For example, using the shifting map illustrated in FIG. 2, when an operating point that is determined by the vehicle speed VSP and the accelerator position opening amount APO moves to a low transmission ratio side or a high transmission ratio side, a transmission request is output, and a transmission control is carried out by a control to change the transmission ratio so as to be capable of obtaining a target input rotational speed (i.e., a target primary rotational speed).

Figure 3:
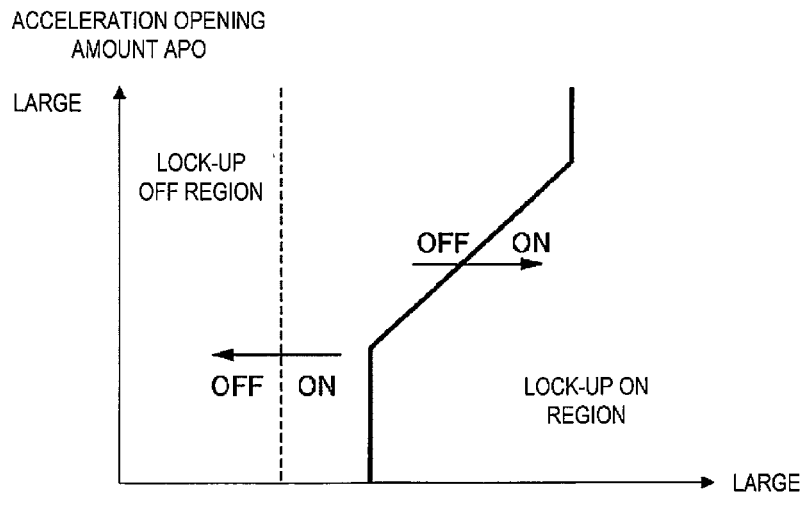
FIG. 3 is a lock-up map view illustrating one example of a lock-up map that is used in the lock-up clutch control of the CVT control unit.

The lock-up clutch control is executed by a lock-up clutch control unit 12b provided in the CVT control unit 12, the purpose of which is to improve fuel efficiency when in a drive traveling state by depressing the accelerator, and is carried out using the lock-up map illustrated in FIG. 3. That is, when an operating point determined by the vehicle speed VSP and the accelerator position opening amount APO crosses the OFF→ON line of FIG. 3, an LU engagement request is output, and the lock-up clutch 3, which is in the released state, is engaged. On the other hand, when an operating point determined by the vehicle speed VSP and the accelerator position opening amount APO crosses the ON→OFF line of FIG. 3, an LU release request is output, and the lock-up clutch 3, which is in the engaged state, is released.

The LU release control is intended to prevent a shock, and is executed by an LU release control unit 12c provided in the CVT control unit 12. This LU release control decreases the clutch engagement capacity of the lock-up clutch 3 that is in an engaged state, to put the lock-up clutch in a released state, or a slip-engaged state, when an accelerator depression operation is carried out while in a coasting state with the driver's foot away from the accelerator (during the LU engaged state and fuel cutoff). The engine control unit 11 and the CVT control unit 12 are connected by a CAN communication line 13 that is capable of exchanging information bidirectionally. In addition, "LU" is used in the descriptions and drawings below as an abbreviation for "lock-up."

Lock-Up Release/Transmission Cooperative Control Configuration

Figure 4:
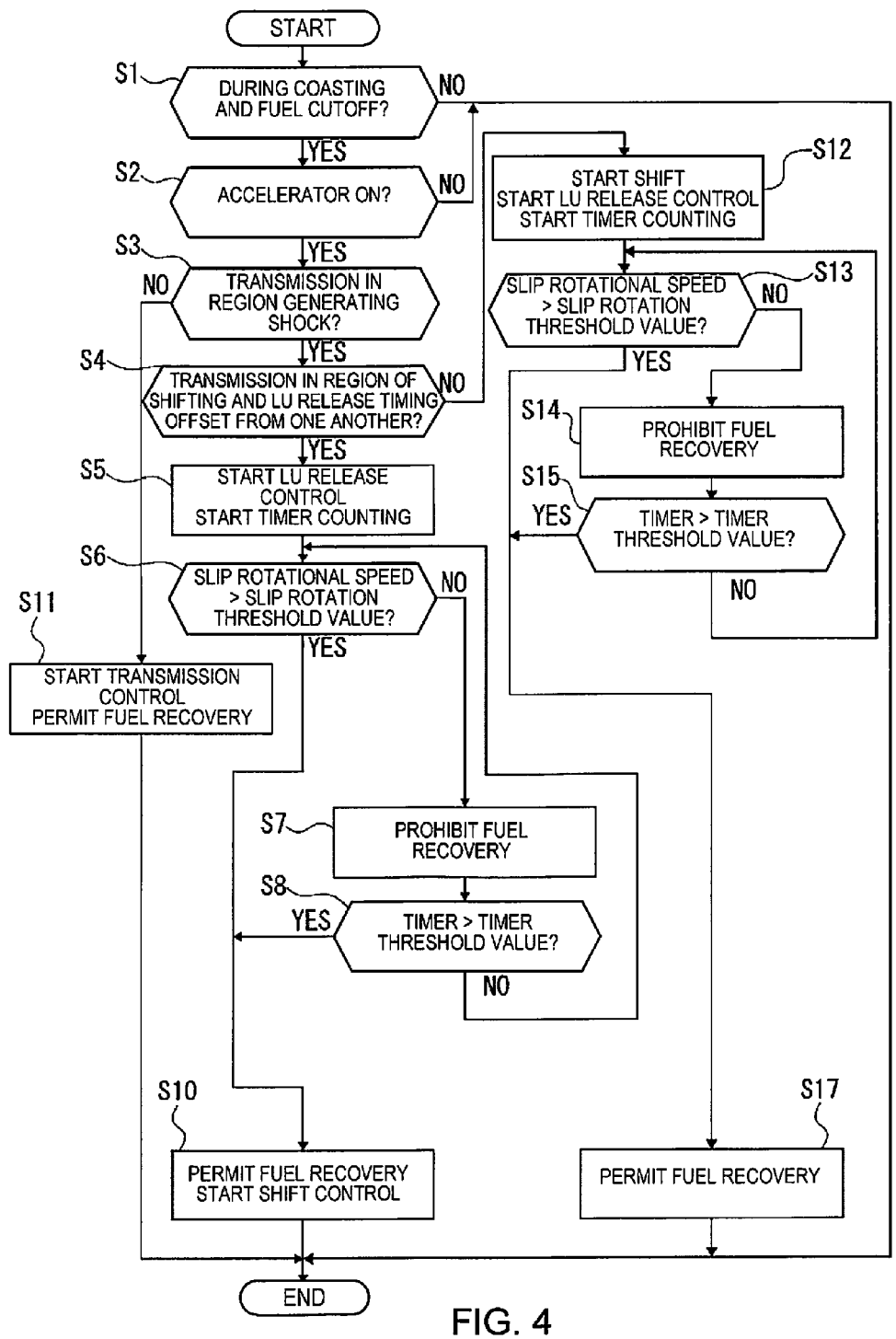
FIG. 4 is a flowchart illustrating the flow of the lock-up release/transmission cooperative control process that is executed in the CVT control unit of the lock-up clutch control device according to the first embodiment.

FIG. 4 illustrates a flowchart of the lock-up release/transmission cooperative control process that is executed by the CVT control unit 12 according to the first embodiment (lock-up release/transmission cooperative control means). The steps in FIG. 4, which represent the configuration of the lock-up release/transmission cooperative control process will be described below.

In Step S1, it is determined whether or not there is a coasting state with the driver's foot away from the accelerator, and whether or not the fuel is being cutoff. In the case of YES (coasting and during fuel cutoff), the process proceeds to Step S2, and in the case of NO (other than coasting and during fuel cutoff), the process proceeds to END.

In Step S2, following the determination that there is a coasting state and that the fuel is being cutoff in Step S1, it is determined whether or not the accelerator pedal has been depressed. If YES (accelerator ON), the process proceeds to Step S3, and if NO (accelerator OFF), the process proceeds to END.

In Step S3, following the determination that the accelerator is ON in Step S2, an engine torque that is inferred from an accelerator depression operation, and a negative inertia torque that is inferred from an execution of a downshift control, are calculated. Then, using the region determination map M1 illustrated in FIG. 5, the vehicle state is determined from the region in which a torque point, which is determined by the two inferred calculated values, belongs. That is, it is determined whether or not the torque point is in a region in which a shock is generated when the accelerator is depressed (the simultaneous control region B or the cooperative control region C in the region determination map M1 of FIG. 5). If YES (simultaneous control region B or cooperative control region C), the process proceeds to Step S4, and if NO (transmission control region A), the process proceeds to Step S11.

Figure 5:
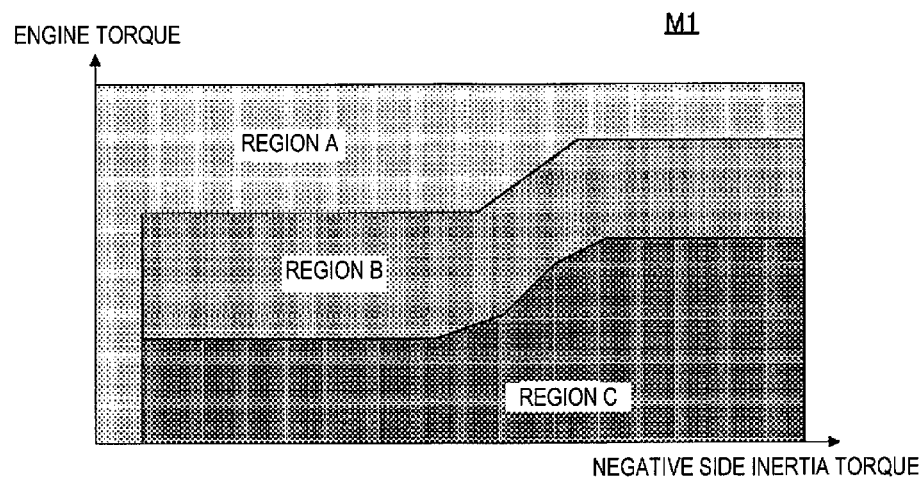
FIG. 5 is a map view illustrating one example of a region determination map that is used in the lock-up release/transmission cooperative control process according to the first embodiment.

In Step S4, following the determination that the region is the simultaneous control region B or the cooperative control region C in Step S3, using the region determination map M1 illustrated in FIG. 5, it is determined whether or not the region is a region in which the shift timing and the LU release timing should be offset from one another (the cooperative control region C), in the same manner as Step S3. If YES (the cooperative control region C), the process proceeds to Step S5, and if NO (the simultaneous control region B), the process proceeds to Step S12.

In Step S5, following the determination that the region is the cooperative control region C in Step S4, an LU release control is started, a timer counting is started, and the process proceeds to Step S6.

In Step S6, following the determination of the LU release control start & timer counting start in Step S5, or, that the timer count value ≤a threshold value in Step S8, it is determined whether or not the slip rotational speed (i.e., engine rotational speed Ne—turbine rotational speed Nt) has exceeded a slip rotation speed threshold value that is set in advance. If YES (slip rotational speed >threshold value), the process proceeds to Step S10, and if NO (slip rotational speed ≤threshold value), the process proceeds to Step S7.

In Step S7, following the determination that the slip rotational speed≤the threshold value in Step S6, fuel recovery is prohibited, even though the accelerator is being depressed, and the process proceeds to Step S8.

In Step S8, following a fuel recovery prohibition in Step S7, it is determined whether or not a timer count value, the counting of which is started in Step S5, has exceeded a timer threshold value that is set in advance. If YES (timer count value>threshold value), the process proceeds to Step S10, and if NO (timer count value≤threshold value), the process returns to Step S6.

In Step S10, following a YES determination in one of Step S6 and Step S8, fuel recovery is permitted, a transmission control is started, and the process proceeds to END.

In Step S11, following the determination that the region is in the transmission control region A in Step S3, a transmission control is started while maintaining the lock-up clutch 3 in the engaged state, fuel recovery is permitted, and the process proceeds to END.

In Step S12, following the determination that the region is in the simultaneous control region B in Step S4, a transmission control and an LU release control are started simultaneously, timer counting is started, and the process proceeds to Step S13.

In Step S13, following the determination of a simultaneous control start & timer counting start in Step S12 or, that the timer count value≤the threshold value in Step S15, it is determined whether or not the slip rotational speed (i.e., engine rotational speed Ne−turbine rotational speed Nt) has exceeded a slip rotation threshold value that is set in advance. If YES (slip rotational speed>threshold value), the process proceeds to Step S17, and if NO (slip rotational speed≤threshold value), the process proceeds to Step S14.

In Step S14, following the determination that the slip rotational speed≤the threshold value in Step S13, fuel recovery is prohibited, even though the accelerator is being depressed, and the process proceeds to Step S15.

In Step S15, following a fuel recovery prohibition in Step S14, it is determined whether or not a timer count value, the counting of which is started in Step S12, has exceeded a timer threshold value that is set in advance. If YES (timer count value>threshold value), the process proceeds to Step S17, and if NO (timer count value≤threshold value), the process returns to Step S13.

In Step S17, following a YES determination in one of Step S13 and Step S15, fuel recovery is permitted, and the process proceeds to END.

Next, the actions are described.
The "Problems of the comparative example", "Action of the lock-up release/transmission cooperative control process", "Action of the lock-up release/transmission cooperative control", "Action of a control switch by a region determination", and "Action of a lock-up release detection" will be separately described regarding the actions of the lock-up clutch control device according to the first embodiment.

Problems of the Comparative Example

The problem of a comparative example in which the LU release control and the transmission control are independently carried out will be described based on the time charts illustrated in FIG. 6 and FIG. 7.

In an automatic transmission vehicle equipped with a torque converter, the accelerator pedal is assumed to be depressed during deceleration while in a coasting state with the foot away from the accelerator (during fuel cutoff). At this time, on the transmission control side, operating point D proceeds to operating point E during deceleration with the foot away from the accelerator on the shifting map illustrated in FIG. 2, and when the accelerator position opening amount is increased by a depression of the accelerator pedal at operating point E, the point proceeds to operating point F. Therefore, the target input rotational speed is increased due to a transition from operating point E to operating point F, and a downshift request is output. On the other hand, on the LU release control side, in order to prevent shock when depressing the accelerator pedal, an LU release request to transition from the lock-up engaged state to the slip-engaged state or to the lock-up release state is output. Therefore, a comparative example shall be one in which, when the accelerator pedal is depressed during deceleration while in a coasting state with the foot away from the accelerator (during fuel cut), an LU release control and a down shift control are started at a contemporaneous timing, in accordance with an LU release request and a downshift request. Here, a contemporaneous timing includes a case in which the two control start timings match, as well as when there is a slight difference in the timing.

First, if the lock-up clutch is kept in an engaged state during an accelerator depression operation from a coasting state, there is a shock due to variation in the longitudinal G (referred to as "tip-in shock"). The causes thereof are as follows: (a) The engine recovery torque is directly transmitted by the lock-up clutch; and (b) Shock due to rattling when the drive shaft changes from a negative torque to a positive torque. Accordingly, when an accelerator depression operation is carried out from a coasting state, by releasing/slip-engaging the lock-up clutch so that the fluid coupling function of the torque converter is exerted, variation in the transmission torque is absorbed to prevent shock.

Figure 6:
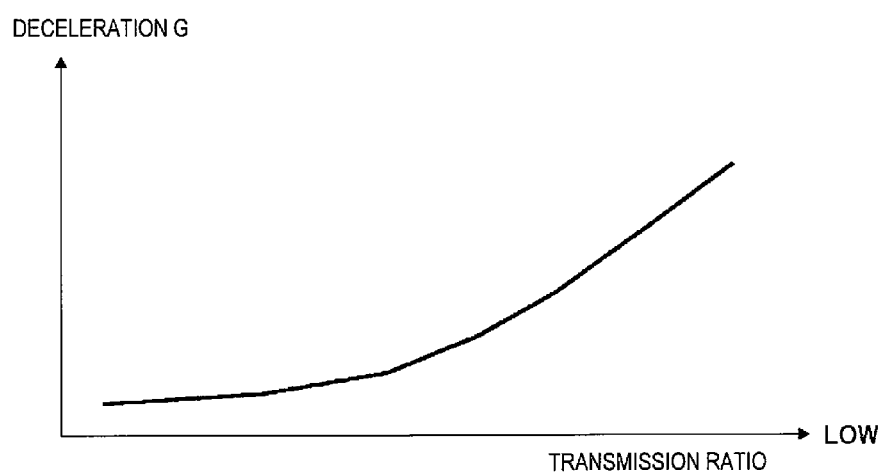
FIG. 6 is a deceleration G characteristic graph illustrating the relationship of the deceleration G with respect to the gear ratio.

However, when decelerating in a lock-up engaged state/coasting state, the deceleration G is increased as the degree to which the transmission ratio is on the LOW side is increased, as illustrated in FIG. 6. Then, when an LU release control is executed when the deceleration G is in a large state, the negative torque is released at once, and the change in the deceleration G is thereby increased. In such a case, if a downshift is executed simultaneously, the negative torque by the inertia torque of the rotating system is added and the change in the deceleration G during a lock-up release is further increased, which exacerbates a vehicle behavior that causes the driver to feel a shock.

The vehicle G change at which the driver feels a shock will be described below with the time chart illustrated in FIG. 7. In FIG. 7, an LU coasting deceleration is an interval up to time t1, and time t1 is an accelerator depression time. Further, time t1-t2 indicates an LU release control & transmission control interval, time t2-t3 indicates an LU engagement control interval, and after time t3 indicates a traveling interval in an LU drive state.

Figure 7:
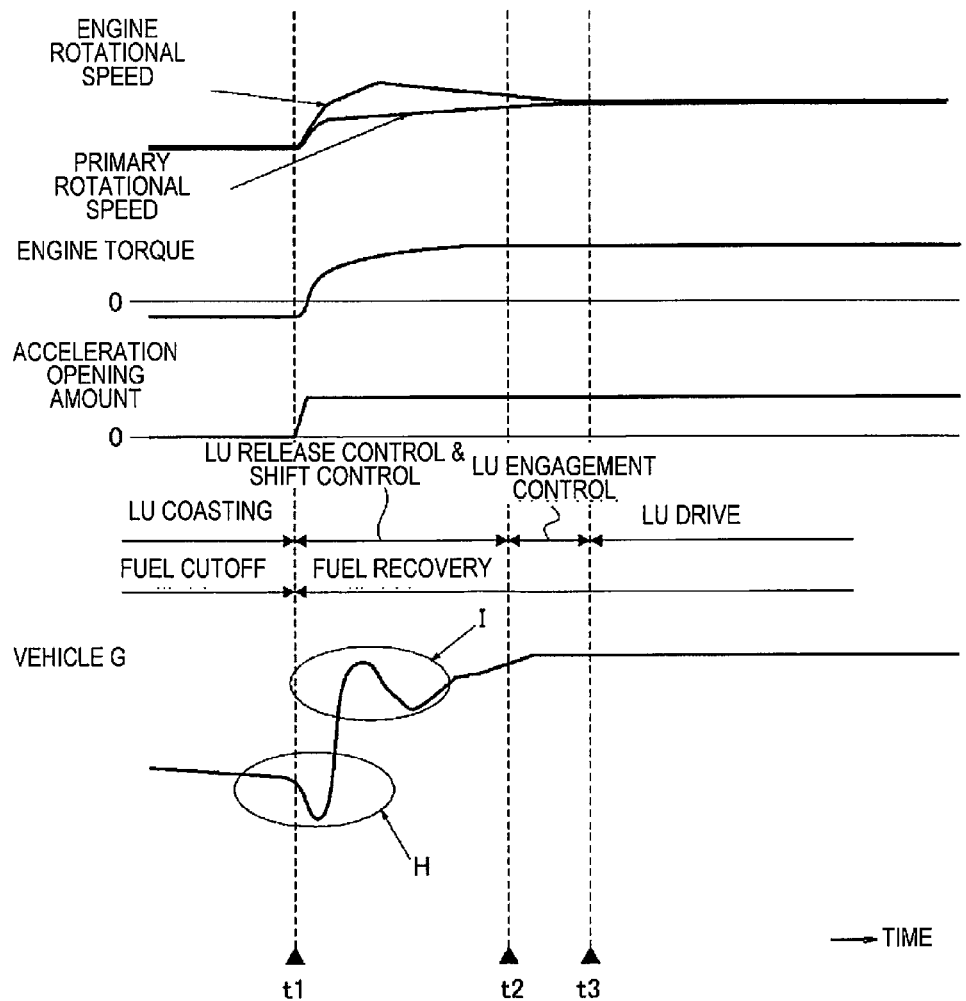
FIG. 7 is a time chart illustrating the respective characteristics of the rotational speed (engine rotation speed, turbine rotational speed)/engine torque/accelerator position opening amount/vehicle G, during an accelerator depression operation from a coasting deceleration state, when carrying out a simultaneous control of a lock-up release/transmission, of a comparative example.

When the LU release control and the downshift control are carried out simultaneously at an accelerator depression time t1, as illustrated by the vehicle G characteristic surrounded by arrow H in FIG. 7, the transmission inertia torque by downshifting is output on the negative side (deceleration side), and a reduction in the vehicle G is exacerbated. Immediately thereafter, when the LU release and fuel recovery coincide, as illustrated by the vehicle G characteristic surrounded by arrow I in FIG. 7, the negative torque is released at once and an increase in the vehicle G is exacerbated, generating a G variation shock due to pulling in and pushing out of the vehicle G. At this time, when the deceleration G during coasting is increased as the degree to which the transmission ratio is on the LOW side is increased, the shock described above is more likely to occur.

Action of the Lock-Up Release/Transmission Cooperative Control Process

The action of the lock-up release/transmission cooperative control process of the first embodiment which solves the problem described above will be described based on the flowchart of FIG. 4.

If the accelerator pedal is depressed when in a coasting state with the foot away from the accelerator and during fuel cutoff, the process proceeds from Step S1→Step S2→Step S3→Step S4 in the flowchart of FIG. 4. In Step S3, it is determined whether or not the region is one in which a shock is generated when the accelerator is depressed (the simultaneous control region B or the cooperative control region C in FIG. 5). In Step S4, it is determined whether or not the region is one in which the shift timing and the LU release timing should be offset from one another (the cooperative control region C). Then, based on the determination of the region in Step S3 or Step S4, the mode is divided into a transmission control mode, a simultaneous control mode, and a cooperative control mode, as described below.

Transmission Control Mode: S11

If determined to be a region in which a shock is not generated when the accelerator is depressed (the transmission control region A) in Step S3, the process proceeds from Step S3 to Step S11→END, in the flowchart of FIG. 4. Then, in Step S11, a transmission control is started and fuel recovery is permitted, while maintaining the lock-up clutch 3 in an engaged state.

Simultaneous Control Mode: S12-S17

It is determined to be a region in which a shock is generated when the accelerator is depressed (the simultaneous control region B or the cooperative control region C) in Step S3, and that it is not a region in which the shift timing and the LU release timing should be offset from one another (the cooperative control region C) in Step S4. In this case, the process proceeds from Step S3 to Step S4→Step S12→Step S13→Step S14→Step S15, in the flowchart of FIG. 4. In Step S12, a transmission control and an LU release control are started simultaneously, and timer counting is started. Since the slip rotational speed≤the threshold value immediately after starting control, the process proceeds from Step S13 to Step S14, and fuel recovery is prohibited. Then, a flow that proceeds from Step S13→Step S14→Step S15 is repeated until one LU release detection condition is established, from among the slip rotational speed condition of Step S13 and the time condition of Step S15. When one LU release detection condition is satisfied, the process proceeds from Step S13 (or Step S15) to Step S17, and fuel recovery is permitted in Step S17.

Cooperative Control Mode: S5-S10

It is determined to be a region in which shock is generated when the accelerator is depressed (the simultaneous control region B or the cooperative control region C) in Step S3, and that it is a region in which the shift timing and the LU release timing should be offset from one another (cooperative control region C) in Step S4. In this case, the process proceeds from Step S3 to Step S4→Step S5→Step S6→Step S7→Step S8, in the flowchart of FIG. 4. In Step S5, only the LU release control is started prior to the transmission control and timer counting is started. Since the slip rotational speed≤the threshold value immediately after starting control, the process proceeds from Step S6 to Step S7, and fuel recovery is prohibited. Then, a flow that proceeds from Step S6→Step S7→Step S8 is repeated until one LU release detection condition is established, from among the slip rotational speed condition of Step S6 and the time condition of Step S8. When one LU release detection condition is satisfied, the process proceeds from Step S6 (or Step S8) to Step S10, and transmission control is started and fuel recovery is permitted in Step S10.

Action of the Lock-Up Release/Transmission Cooperative Control

As described above, the first embodiment is configured to carry out a cooperative control in which, if there is an accelerator depression operation while coasting with the lock-up clutch 3 in an engaged state (during a fuel cutoff of the engine 1), the LU release timing and the shift timing are offset from one another.

Figure 8:
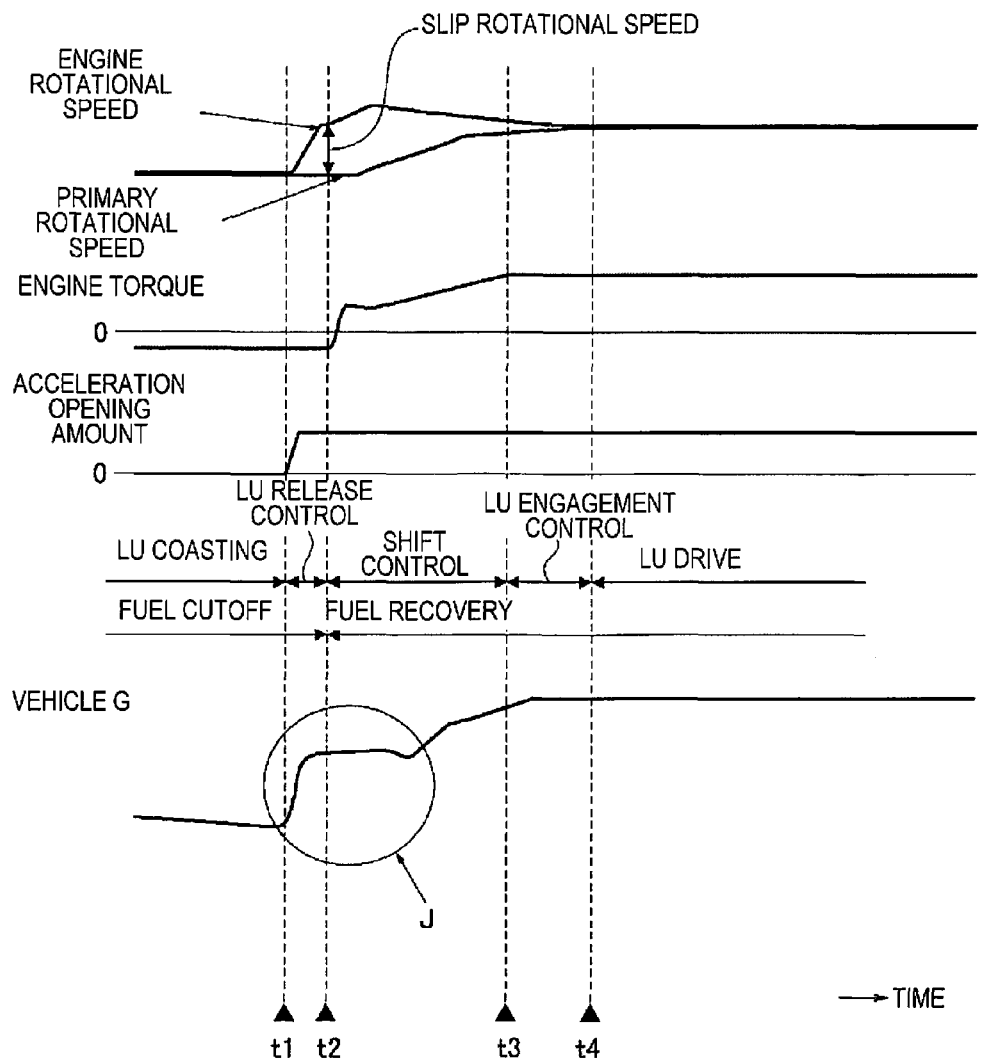
FIG. 8 is a time chart illustrating the respective characteristics of the rotational speed (engine rotation speed, turbine rotational speed)/engine torque/accelerator position opening amount/vehicle G, during an accelerator depression operation from a coasting deceleration state, when carrying out the lock-up release/transmission cooperative control of the first embodiment.

The action of this lock-up release/transmission cooperative control in the first embodiment will be described below, based on the time chart of FIG. 8. FIG. 8, shows an LU coasting deceleration interval up to time t1, and time t1 is an accelerator depression time. Further, time t1-t2 indicates an LU release control interval, time t2-t3 indicates downshift control interval, time t3-t4 indicates an LU engagement control interval, and after time t4 indicates a traveling interval in an LU drive state.

If an LU release control is carried out first at the accelerator depression time t1, first, the torque converter 4 is put in a fluid coupling state, so the transmission inertia torque at the time of downshift can be absorbed with the torque converter 4. Thus, even if a downshift control is carried out at the LU release detection time t2, the transmission inertia torque does not exacerbate the variation in the vehicle G.

Accordingly, as illustrated in the vehicle G characteristic surrounded by arrow J in FIG. 8, the vehicle G is smoothly increased, and the generation of shock due to G variation can be suppressed.

That is, by offsetting the timing of the change in the transmission torque at the time of a transition from lock-up engagement to release, and the timing of the change in the inertia torque due to shifting, the impact on the vehicle behavior is ameliorated, and the driver does not feel a shock. As a result, it is possible to reduce the generation of shock during an accelerator depression operation from a state of coasting.

The first embodiment was configured to start a down shift control after the LU release control is started first and the LU release is detected, when an LU release request and a downshift request are output due to an accelerator depression operation, during coasting in an engaged state of the lock-up clutch 3. That is, by starting the LU release control first and stopping the down shift control until an LU release is detected, a down shift control is started in an LU released state, and it is possible to absorb the inertia torque at the time of downshift with the torque converter 4. Therefore, the impact to the vehicle behavior can be ameliorated more than when the LU release/downshift are simultaneous, or when starting the downshift first, and the driver does not feel shock.

Action of the Control Switch by a Region Determination

The region determination map M1 illustrated in FIG. 5 divides the two-axis coordinate plane formed by the engine torque axis and the transmission inertia torque axis into region A (the transmission control region), region B (the simultaneous control region), and region C (the cooperative control region).

Region A is a region in which shock does not occur even if LU is not released. The region A is set in regions in which engine torque becomes large, and regions in which the negative inertia torque is small, as illustrated in FIG. 5.

Region B is a region in which the downshift timing and the LU release timing may be the same, but in which a shock is generated if the LU is not released. The region B is set in a region in which the engine torque becomes smaller than in region A, and in a region in which the transmission ratio is on the LOW side and in which the engine torque is offset more on the high side as the negative inertia torque is increased, as illustrated in FIG. 5.

Region C is a region in which a shock is generated if downshift and LU release are carried out simultaneously. The region C is set in a region in which the engine torque becomes even smaller than in region B, and in a region in which the transmission ratio is on the LOW side and in which the engine torque is expanded more to the high side as the negative inertia torque is increased, as illustrated in FIG. 5.

The common cause of shock that occurs in regions B and C is shock at the time of fuel cutoff recovery, or rattling shock of the drive system when the torque on the drive shaft axis crosses from the negative side to the positive side. The common shock measure is the LU release control, and shock is reduced by slipping the clutch from an engaged state of the lock-up clutch 3, or, by absorbing the torque variation that would generate shock with the torque converter 4 by releasing the clutch.

Of regions B and C, region B is a region in which it is possible to ignore the impact that the inertia torque caused by downshifting has on shock. For example, there are cases in which upshifting is carried out, or a case in which the shift amount by downshifting is small and that the inertia torque due to shifting does not exacerbate the deceleration G. Other than the above, when the engine torque output is greater than the torque output with which the deceleration G would drop after fuel recovery, a drop in the deceleration G will not occur; therefore, there is no problem in carrying out downshifting simultaneously with the LU release control.

In contrast, region C is a region in which a shock would be generated if the downshift timing and the LU release timing are the same, that is, a region in which a shock would be generated unless the LU release timing and the downshift timing are not shifted, as illustrated in the comparative example characteristics of FIG. 7.

The first embodiment was configured to comprise a Step S3 that determines regions B and C in which a shock is generated unless the LU is not released, if an accelerator depression operation is determined during coasting, and a Step S11 in which a transmission control is started if NO is determined in Step S3. That is, if region A is determined in which a shock is not generated even if LU is not released, downshift control is started maintaining the engaged state of the lock-up clutch 3, and fuel recovery is also permitted. Therefore, in a vehicle state in which a shock problem does not exist, a responsive re-acceleration can be obtained with respect to an accelerator depression operation.

The first embodiment comprises a Step S4 that determines region C in which the LU release timing and the shift timing should be offset from one another if YES is determined in Step S3. Further, the first embodiment comprises Steps S12-S17 in which the LU release control and the shift control are simultaneously started if NO is determined in Step S4. The embodiment is configured to comprise Steps S5-S10 in which a control is carried out to offset the lock-up release timing and the shift timing, if YES is determined in Step S4. That is, it is determined whether or not the transmission inertia torque will have an impact on the vehicle behavior if LU release (including slip) is simultaneously executed according to the target shift destination; if determined to not have an impact, LU release (including slip) and shifting are carried out simultaneously. Intrinsically, in a scene in which the inertia torque during upshift is output on the positive side and in which the driver does not feel a shock, simultaneous control is not executed and, thus, the acceleration performance can be maintained. In addition, during downshift, in a region in which the engine torque output of greater than or equal to a certain accelerator position opening amount is large, torque is output even after LU is released, and it is possible to cancel out the transmission inertia torque and the drop in the deceleration G after a release by an LU release; therefore, impact to the vehicle behavior is reduced, and the driver does not feel a shock. In such a case, the acceleration feeling is improved when shifting is quickly carried out to the LOW side, and it is better to carry out shifting simultaneously without waiting for the LU release to be completed, which can be realized. Therefore, if a shock problem does not exist even with a simultaneous control, it is possible to achieve an improvement in the acceleration feeling with respect to an accelerator depression operation, by providing a leeway to select a simultaneous control of the LU release and shift.

The first embodiment is provided with a region determination map M1 in which the two-axis coordinate plane formed by the engine torque axis and the transmission inertia torque axis is divided into region A (the transmission control region), region B (the simultaneous control region), and region C (the cooperative control region). Then, in Steps S3 and S4, an engine torque that is inferred from an accelerator depression operation, and a negative inertia torque that is inferred from an execution of a shift control, are calculated. The embodiment was configured to determine the vehicle state from the region in which a torque point, which is determined by the two inferred calculated values, belongs in the region determination map M1. That is, the embodiment is configured to switch between a transmission control mode (Step S11), a simultaneous control mode (Steps S12-S17), and a cooperative control mode (Steps S5-S10), according to a region determination using the region determination map M1 illustrated in FIG. 5. Therefore, the vehicle state is accurately inferred from a simple region determination that uses the region determination map M1, and it is possible to select the optimum control mode according to the vehicle state from shift control/simultaneous control/cooperative control.

Action of the Lock-Up Release Detection

In Step S6, it is determined whether or not the slip rotational speed has exceeded a slip rotation speed threshold value that is set in advance. Since it can be determined that the lock-up clutch 3 has been released (slip) if the slip rotational speed has exceeded the threshold value, fuel cutoff recovery is permitted, downshifting is started, and the control is ended in Step S10. In this manner, generation of a shock due to the effect of transmission inertia can be prevented, and fuel cutoff recovery shock can be reliably avoided. Here, the slip rotation speed threshold value is set in advance to a value that indicates a clutch slip with which shock is not generated. If the slip rotational speed does not exceed the slip rotation speed threshold value, since LU is not released (slip), fuel cutoff recovery is prohibited in order to avoid shock caused by fuel cutoff recovery (Step S7).

Then, in Step S8, it is determined whether or not a timer value that is set when starting the LU release control has exceeded a timer threshold value. If the timer threshold value is not exceeded, the process proceeds to Step S9, and if the timer threshold value has been exceeded, the process proceeds to Step S10, fuel cutoff recovery is permitted, shifting is started, and the control is ended. In this case, there is a possibility that a shock could be generated, but since it would impart more anxiety and discomfort to the driver if torque is not output even when the accelerator is depressed, fuel cutoff recovery is permitted and the shifting control is started simultaneously, after which the control is ended. Here, the timer threshold value is set to a time with which anxiety and discomfort are not imparted to the driver. With the above, fuel cutoff recovery is always carried out even if LU release (slip) control does not operate or work well for some reason, and anxiety and discomfort will not be imparted to the driver.

As described above, the first embodiment is configured such that, if the LU release control is started, with the establishment of one condition from among: (a) a slip rotational speed condition in which the slip rotational speed has exceeded a threshold value that is set in advance; or (b) a time condition in which the elapsed time from the start of the LU release control has exceeded a threshold value that is set in advance, it is detected that the timing is one in which the lock-up clutch 3 has been put in a lock-up release state. Therefore, it is possible to detect the timing at which the lock-up clutch 3 has started to be released, without imparting discomfort to the driver. Meanwhile, (a) and (b) respectively show the following effects. (a) Since slip is started by the lock-up torque capacity being reduced, it is possible to reliably detect that the lock-up clutch 3 has started to be released. (b) While discomfort (hesitation) is imparted to the driver if the shift is too delayed due to the lock-up release being delayed, it becomes possible to prevent such a case. Since the original object of the present invention is to provide measures against recovery shock and rattling shock when transitioning to a positive torque, shifting can be configured to be started when an engine torque is output. If the shifting is delayed, discomfort will be imparted in the same manner as (b).

The first embodiment was configured to prohibit fuel recovery of the engine 1 when the LU release control is started, and to permit fuel recovery when detecting a timing at which the lock-up clutch 3 is put in an LU release state. That is, fuel recovery is prohibited when an LU release control is started, and fuel recovery is not carried out until an LU release (including slip) is detected. Therefore, it is possible to avoid a recovery shock and rattling shock by delaying the establishment of the engine torque condition (c), and basically to permit fuel recovery after waiting for the establishment of the slip rotational speed condition (a).

Next, the effects are described. In the lock-up clutch control device according to the first embodiment, it is possible to obtain the effects listed below.

(1) In a vehicle (an engine-equipped vehicle) provided with a torque converter 4 including a lock-up clutch 3 between an engine 1 and a transmission (continuously variable transmission 6), provided with: a fuel cutoff control means (the fuel cutoff control unit 11a) that stops the fuel injection to the engine 1 when in a coasting state by releasing the driver's foot from the accelerator, and restarts the fuel injection based on a fuel recovery permission; and a lock-up release/transmission cooperative control means (the CVT control unit 12) that carries out a cooperative control of a lock-up release control (the LU release control unit 12c) that reduces the clutch engagement capacity of the lock-up clutch 3, and a transmission control (the transmission control unit 12a) that shifts the transmission, the lock-up release/transmission cooperative control means (the CVT control unit 12) offsets the lock-up release timing and the shift timing if there is an accelerator depression operation while coasting with the lock-up clutch 3 in an engaged state (FIG. 8). Accordingly, it is possible to reduce the generation of a shock during an accelerator depression operation from a state of coasting.

(2) The lock-up release/transmission cooperative control means (the CVT control unit 12) starts a downshift control after the lock-up release control (the LU release control) is started first and a lock-up release (the LU release) is detected, when a lock-up release request (the LU release request) and a downshift request are output due to an accelerator depression operation, during coasting in an engaged state of the lock-up clutch 3 (FIG. 8). Accordingly, in addition to the effect of (1), it is possible to achieve a cooperative control in which the impact to the vehicle behavior is ameliorated more than when the LU release/downshift are simultaneous, or when starting the downshift first, and in which the driver does not feel a shock.

(3) The lock-up release/transmission cooperative control means (the CVT control unit 12) determines whether or not the transmission inertia torque will have an impact on the vehicle behavior if shifting and lock-up release are simultaneously executed (S4 in FIG. 4); if determined not to have an impact on the vehicle behavior (NO in S4 of FIG. 4), lock-up release control and shift control are carried out simultaneously (S12-S17 in FIG. 4). Therefore, in addition to the effects of (1) or (2), if a shock problem does not exist even with a simultaneous control, it is possible to achieve an improvement in the acceleration feeling with respect to an accelerator depression operation by providing a leeway to select a simultaneous control of the LU release and shift.

(4) When the lock-up release control is started (S4 in FIG. 4), the lock-up release/transmission cooperative control means (the CVT control unit 12), with the establishment of one of the following conditions: (a) a slip rotational speed condition in which the slip rotational speed, which is the difference in the rotational speed between the engine rotation speed and the turbine rotational speed, has exceeded a threshold value that is set in advance (S6 in FIG. 4), or (b) a time condition in which the elapsed time from the start of the LU release control has exceeded a threshold value that is set in advance (S8 in FIG. 4), detects that the timing is one in which the lock-up clutch 3 has been put in a lock-up release state. Accordingly, in addition to the effects of (1)-(3), it is possible to detect the timing at which the lock-up clutch 3 has started to be released, without imparting discomfort to the driver.

(5) The lock-up release/transmission cooperative control means (CVT control unit 12) prohibits fuel recovery of the engine 1 when the lock-up release control (LU release control) is started (S7 and S14 in FIG. 4), and permits fuel recovery when detecting a timing at which the lock-up clutch 3 is put in a lock-up release state (S10 and S17 in FIG. 4). Accordingly, in addition to the effect of (4), it is possible to avoid recovery shock and rattling shock by delaying the establishment of the engine torque condition (c), and basically to permit fuel recovery after waiting for the establishment of the slip rotational speed condition (a).

The lock-up clutch control device of the present invention was described above based on the first embodiment, but specific configurations thereof are not limited to the first embodiment, and various modifications and additions to the design can be made without departing from the scope of the invention according to each claim in the claims.

In the first embodiment, an example was shown in which a downshift control is started after the LU release control is started first and the LU release is detected, when there is an accelerator depression operation during coasting in an engaged state of the lock-up clutch 3. However, the lock-up release/transmission cooperative control means may be an example in which the LU release control is started after the downshift control is started first and the end of the transmission inertia phase is detected. That is, any configuration may be employed, as long as the lock-up release timing and the shift timing are offset from one another.

In the first embodiment, an example was shown in which the shift control/simultaneous control/cooperative control are selectively used based on a determination of the predicted vehicle behavior, as the lock-up release/transmission cooperative control means. However, the lock-up release/ transmission cooperative control means may be an example in which the transmission control/cooperative control are selectively used, or an example in which cooperative control is always carried out when there is an accelerator depression operation during coasting in an engaged state of the lock-up clutch.

In the first embodiment, an example was shown in which it is detected that the timing is one in which the lock-up clutch 3 has been put in a lock-up release state with the establishment of one condition from among a slip rotational speed condition and a time condition, when the LU release control is started. However, the lock-up release/transmission cooperative control means may be an example in which it is detected that the timing is one in which the lock-up clutch 3 has been put in a lock-up release state with the establishment of other conditions, such as an engine torque condition, in addition to the two conditions, when the LU release control is started. Also possible is an example in which, using one of the conditions, it is detected that the timing is one in which the lock-up clutch 3 has been put in the LU release state with the establishment/non-establishment of the one condition.

In the first embodiment, an example was shown in which fuel recovery of the engine 1 is prohibited when the LU release control is started, and fuel recovery is permitted when detecting a timing at which the lock-up clutch 3 is put in the LU release state, as the lock-up release/transmission cooperative control means. However, the lock-up release/ transmission cooperative control means may be an example in which fuel recovery of the engine is permitted when the LU release control is started.

In the first embodiment, an example was shown in which the lock-up clutch control device of the present invention is applied to an engine-equipped vehicle equipped with a continuously variable transmission. However, the lock-up clutch control device of the present invention may be applied to a hybrid vehicle, and the transmission may be an automatic transmission that carries out stepped transmission, as long as the vehicle is equipped with an engine as a drive source. In short, the lock-up clutch control device may be applied to any vehicle provided with a torque converter comprising a lock-up clutch between the engine and the transmission.

The invention claimed is:

1. A vehicle lock-up clutch control device comprising:
a torque converter including a lock-up clutch provided in the vehicle between an engine and a transmission;
a fuel cutoff control unit that stops fuel injection to the engine while in a coasting state by releasing a foot from an accelerator, and restarts fuel injection based on a fuel recovery permission; and
a lock-up release/transmission cooperative control unit that carries out a cooperative control of a lock-up release control that reduces a clutch engagement capacity of the lock-up clutch, and a transmission control that shifts the transmission, the lock-up release/transmission cooperative control unit offsets a lock-up release timing and a shift timing from one another if there is an accelerator depression operation while coasting with the lock-up clutch in an engaged state.

2. The vehicle lock-up clutch control device according to claim 1, wherein
the lock-up release/transmission cooperative control unit starts a downshift control of the transmission control after the lock-up release control is started first and a lock-up release is detected, upon a lock-up request and a downshift request being outputted due to the accelerator depression operation, during coasting in the engaged state of the lock-up clutch.

3. The vehicle lock-up clutch control device according to claim 2, wherein
the lock-up release/transmission cooperative control unit determines whether or not a transmission inertia torque will impact vehicle behavior if a shifting release and the lock-up release are simultaneously executed, and simultaneously carries out the lock-up release control and the transmission control if determined to not impact the vehicle behavior.

4. The vehicle lock-up clutch control device according to claim 2, wherein
when the lock-up release control is started, the lock-up release/transmission cooperative control unit detects that a timing is one in which the lock-up clutch has been put in a lock-up release state with establishment of one of the following conditions:
(a) a slip rotational speed condition in which a slip rotational speed, which is the difference in a rotational speed between an engine rotation speed and a turbine rotational speed, has exceeded a first preset threshold value, or
(b) a time condition in which an elapsed time from a start of the lock-up release control has exceeded a second preset threshold value.

5. The vehicle lock-up clutch control device according to claim 4, wherein
the lock-up release/transmission cooperative control unit prohibits fuel recovery of the engine when the lock-up release control is started, and permits fuel recovery when detecting the timing at which the lock-up clutch is put in the lock-up release state.

6. The vehicle lock-up clutch control device according to claim 1, wherein
the lock-up release/transmission cooperative control unit determines whether or not a transmission inertia torque will impact vehicle behavior if shifting and lock-up release are simultaneously executed, and simultaneously carries out the lock-up release control and the transmission control if determined to not impact the vehicle behavior.

7. The vehicle lock-up clutch control device according to claim 6, wherein
when the lock-up release control is started, the lock-up release/transmission cooperative control unit detects that a timing is one in which the lock-up clutch has been put in a lock-up release state with establishment of one of the following conditions:
(a) a slip rotational speed condition in which a slip rotational speed, which is the difference in a rotational speed between an engine rotation speed and a turbine rotational speed, has exceeded a first preset threshold value, or
(b) a time condition in which an elapsed time from a start of the lock-up release control has exceeded a second preset threshold value.

8. The vehicle lock-up clutch control device according to claim 7, wherein
the lock-up release/transmission cooperative control unit prohibits fuel recovery of the engine when the lock-up release control is started, and permits fuel recovery when detecting the timing at which the lock-up clutch is put in the lock-up release state.

9. The vehicle lock-up clutch control device according to claim 1, wherein
when the lock-up release control is started, the lock-up release/transmission cooperative control unit detects that a timing is one in which the lock-up clutch has been put in a lock-up release state with establishment of one of the following conditions:
(a) a slip rotational speed condition in which a slip rotational speed, which is the difference in a rotational speed between an engine rotation speed and a turbine rotational speed, has exceeded a first preset threshold value, or
(b) a time condition in which an elapsed time from a start of the lock-up release control has exceeded a second preset threshold value.

10. The vehicle lock-up clutch control device according to claim 9, wherein
the lock-up release/transmission cooperative control unit prohibits fuel recovery of the engine when the lock-up release control is started, and permits fuel recovery when detecting the timing at which the lock-up clutch is put in the lock-up release state.

* * * * *